United States Patent
Siegel et al.

[11] Patent Number: 6,082,244
[45] Date of Patent: Jul. 4, 2000

[54] PISTON PUMP

[75] Inventors: Heinz Siegel, Stuttgart; Manfred Hauser, Schwieberdingen; Norbert Alaze, Markgroeningen; Dieter Merklein, Kempten; Wolfgang Schuller, Sachsenheim; Julius Bayrhof, Lindenberg; Walter Kremsreiter, Hindelang; Joachim Evertz, Sonthofen; Joerg Zielke, Immenstadt; Ralf Zitzelsberger, Marktoberdorf; Andreas Weh, Durach; Bernd Allenzon, Wiggensbach, all of Germany

[73] Assignee: Robert Bosch GmbH, Stuggart, Germany

[21] Appl. No.: 09/124,913

[22] Filed: Jul. 30, 1998

[30] Foreign Application Priority Data

Jul. 30, 1997 [DE] Germany .............................. 197 32 817

[51] Int. Cl.[7] .............................. F15B 21/04; F04B 23/00
[52] U.S. Cl. .............................................. 92/78; 417/313
[58] Field of Search ................................. 92/78, 128, 172; 417/470, 313, 549, 554, 545

[56] References Cited

U.S. PATENT DOCUMENTS

| | | | |
|---|---|---|---|
| 5,320,498 | 6/1994 | Fuchida | 417/554 X |
| 5,540,570 | 7/1996 | Schuller et al. | 417/545 |
| 5,562,430 | 10/1996 | Schuller et al. | 417/545 |

FOREIGN PATENT DOCUMENTS 0 761 967 A1   5/1996   European Pat. Off. .

*Primary Examiner*—John E. Ryznic
*Attorney, Agent, or Firm*—Ronald E. Greigg; Edwin E. Greigg

[57] ABSTRACT

The invention relates to a piston pump having a piston that is axially displaceable in a bush. In order to keep the piston in the bush in a manner secured against loss, a tubular filter is secured to the bush in the extension thereof; the filter has a smaller inside diameter than the bush and in this way keeps the piston in the bush.

8 Claims, 2 Drawing Sheets

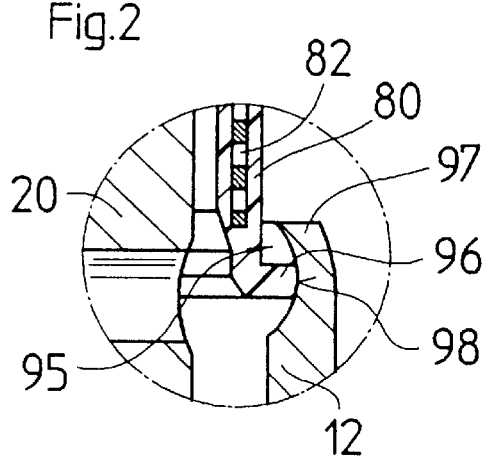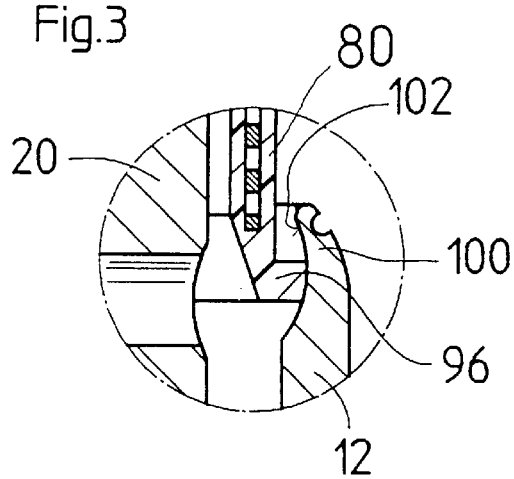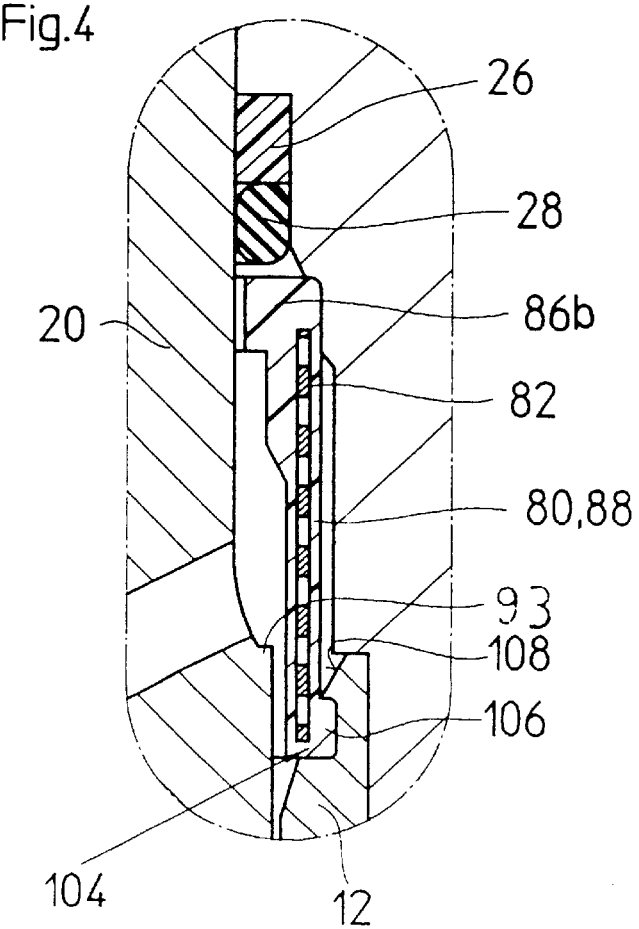

PISTON PUMP

BACKGROUND OF THE INVENTION

The invention relates to a piston pump as defined hereinafter.

The piston pump is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from braking out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

Many such piston pumps are known. One example that can be named is the piston pump known from German Patent Disclosure DE 41 07 979 A1.

The known piston pump has a rodlike piston, which is displaceably guided axially in a bush. For driving the piston to execute a reciprocating stroke motion, an eccentric element drivable to rotate by an electric motor is used, which acts upon the piston on a face end protruding out of the bush. The bush is inserted into a cylinder bore of a pump housing.

For assembling the known piston pump, its piston is introduced into the bush, and the bush is then screwed into the cylinder bore. The assembly often proves to be difficult, since the piston is not retained in the bush until after the bush has been inserted into the pump housing. This makes assembly more difficult, especially in the case of piston pumps that have a piston restoring spring that forces the piston out of the bush. A further hindrance to assembly in many such piston pumps, which are intended as pumps in hydraulic vehicle brake systems, is that a check valve is mounted as an inlet or outlet valve on the piston, so that even more individual parts have to be put together that gain a secure hold only after the bush together with the piston is inserted into the cylinder bore of the pump housing.

OBJECT AND SUMMARY OF THE INVENTION

The piston pump according to the invention has the advantage that the piston pump can be premounted as a compact structural group outside the pump housing. This structural group is sturdy and easily manipulated, and all of its parts are held together in a manner secured against loss. The structural group can be inserted simply, at minimal expenditure of labor, into a cylinder bore of the pump housing, for instance, by press-fitting.

The piston pump has a hollow-cylindrical or tubular filter, which has approximately the same diameter as the bush and is mounted on the bush on the end that protrudes from the piston. The filter surrounds the bush, or a part of the piston protruding from the bush. The filter has a loss-prevention means, which protrudes inward with respect to a bore of the bush and keeps the piston in the bush, for instance on an annular shoulder or at a right mounted on the piston. The loss-prevention means may be embodied annularly or hollow-cylindrically, for instance; that is, at least one point the filter has a smaller inside diameter than the bush. However, it is also sufficient for the loss-prevention means to be embodied as a protrusion or the like on only one or a few points of the circumference. Depending on the embodiment, the loss-prevention means can in principle be located at any arbitrary point in the axial direction of the filter in the axial direction.

Mounting the filter on the bush in the extension thereof can be done for instance by adhesive bonding, screwing, a bayonet mount, and so forth. The mounting can also be done for instance by means of a press-fit, a snap or detent connection, or by a deformation such as crimping or caulking.

With the aid of the easily mountable filter, a preassembled structural group that includes the bush and the piston is obtained. This has the advantage that the piston pump can easily be inserted into the pump housing with only a few mounting steps or a few manual operations.

The filter can be embodied and mounted on the bush in such a way that even before these parts are inserted into the pump housing, an axial alignment of the piston relative to the bush is created via this filter.

This advantageously makes the installation of the parts that have to be built into the pump housing substantially easier.

The invention will be better understood and further objects and advantages thereof will become more apparent from the ensuing detailed description of preferred embodiments taken in conjunction with the drawings.

BRIEF DESCRIPTION OF THE DRAWINGS

FIGS. 2 and 3 show details indicated by reference numeral II in FIG. 1 of modified embodiments of the piston pump of the invention, on a different scale; and FIG. 4 shows a detail of a further modified embodiment of a piston pump according to the invention, indicated by reference numeral IV in FIG. 1, on a different scale.

DESCRIPTION OF THE PREFERRED EMBODIMENTS

Figure 1:
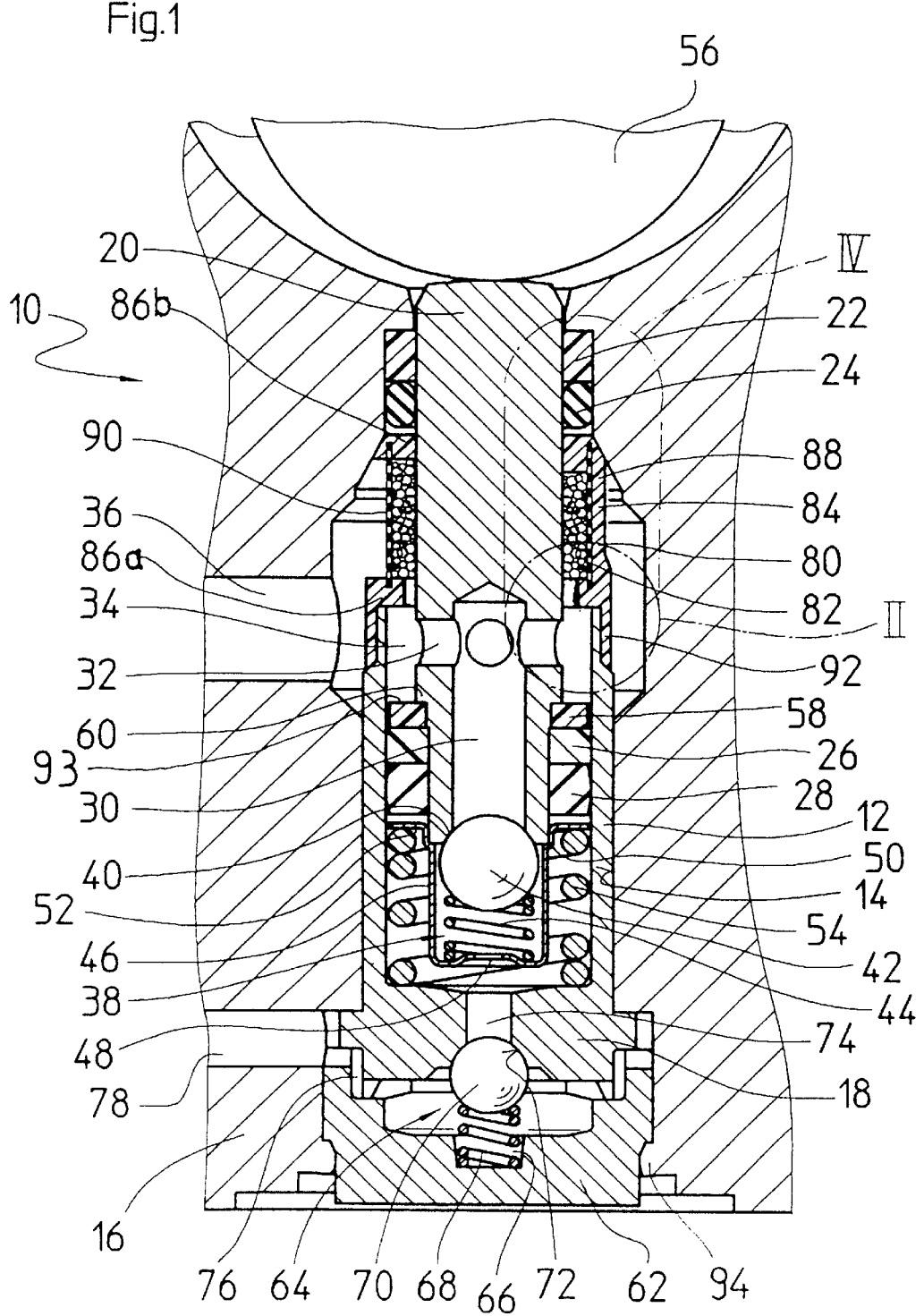
FIG. 1 is an axial section through a piston pump according to the invention.

The piston pump of the invention, indicated overall by reference numeral 10, shown in FIG. 1 has a bush 12, which is inserted into a stepped cylinder bore 14 of a hydraulic block that forms a pump housing 16. The hydraulic block, of which only a fragment surrounding the piston pump 10 is shown in the drawing, is part of a slip-controlled hydraulic vehicle brake system not otherwise shown here. Inserted into it besides the piston pump 10 are hydraulic components, such as magnet valves and hydraulic reservoirs, and a master cylinder and a wheel brake cylinder are connected to it. By means of the hydraulic block, the hydraulic components are hydraulically connected to one another.

The bush 12 is a hollow-cylindrical turned part, with a bush bottom 18 integral with it. Its cylindrical inside surface is rolled or cold-headed. The bush 12 may, however, also be produced in an especially simple way as a cold-headed part without metal-cutting surface machining.

A rodlike piston 20 is received over approximately half its length in the bush 12. An end of the piston 20 located inside the bush 12 is axially displaceably guided by a guide ring 26 on the inside surface of the bush 12 and is sealed off by a sealing ring 28. The other end of the piston 20, which protrudes from the bush 12, is axially displaceably guided by means of a guide ring 22 directly in the cylinder bore 14 of the pump housing 16 and is sealed off by a sealing ring 24 on the pump housing 16.

For admitting fluid, the piston 20 is provided with an axial blind bore 30 extending from its end located in the bush 12; near its bottom, this bore is intersected by transverse bores 32. The piston 20 has a diameter smaller than an inside diameter of the bush 12, so that an annular interstice 34 exists between the piston 20 and the bush 12. The blind bore 30 and the transverse bores 32 communicate through this interstice 34 and an open face end of the bush 12, with an inlet bore 36 which discharges radially to the piston pump 12 into the cylinder bore 14 at the level of the open face end of the bush 12.

As its inlet valve 38, the piston pump 10 of the invention has a spring-loaded check valve, which is mounted on the end of the piston 20 located in the bush 12. An orifice of the blind bore 30 is embodied as a conical valve seat 40, against which a valve ball 42 is pressed, as a valve closing body, by a helical compression spring, acting as a valve closing spring 44. The valve closing spring 44 is braced against a bottom of a cup-shaped valve cage 46, which is produced as a deep-drawn part from sheet metal and has axial and/or radial openings 48. On its open end, the valve cage 46 has an encompassing annular shoulder 50, with which it rests on the face end of the piston 20 located in the bush 12, and a radial flange 52, at which it is pressed against the face end of the piston 20 by a piston restoring spring 54. The valve ball 42 and the valve closing spring 44 are received in the valve cage 46. The piston restoring spring 54 is embodied as stronger than the valve closing spring 44. The piston restoring spring 54 is braced against the bush bottom 18.

To drive the piston 20 to execute an axially reciprocating stroke motion, the piston pump 10 of the invention has an eccentric element 56, which can be driven to rotate by an electric motor and against whose circumference the piston 20 is pressed by the piston restoring spring 54.

The guide ring 26 located in the bush 12 and the sealing ring 29 are fixed on the piston 20 in the axial direction between the radial flange 52 of the valve cage 46 and a support ring 58 that rests on an annular shoulder 60 of the piston 20.

In the region of the bush bottom 18, a cylindrical closure element 62 is pressed onto the bush 12; it acts to provide pressure-tight closure of the cylinder bore 14 and to fix the bush 12 in the pump housing 16. The closure element 62 may also be joined to the bush 12 via a crimped connection; a radial play may be provided between the bush 12 and the closure element 62. An outlet valve 64 in the form of a spring-loaded check valve is accommodated in the closure element 62. The closure element 62 has a coaxial blind bore 66, into which a helical compression spring as a valve closing spring 68 and a valve ball 70 as a valve closing body are inserted. The valve ball 70 cooperates with a conical valve seat 72 which is provided at an orifice of a center bore 74 that axially penetrates the bush bottom 18. The valve seat 72 can be shaped and hardened by stamping, or it can be made in a single operation with the bush 12 in the cold-heading thereof. A fluid outlet is provided through radial conduits 76 between the bush bottom 18 and the closure element 62, into a radial outlet bore 78 in the pump housing 16.

In the extension of the bush 12, on its open end, a hollow-cylindrical filter 80 is mounted, which has approximately the same diameter as the bush 12. The filter 80 has a filter screen 82, in the form of a tubular cloth, which is spray-coated with a filter scaffold of plastic. The cloth is of metal or plastic. On its face end toward the bush 12, the filter 80 has a ring 86*a*, and on its end toward the eccentric element 56 the filter 80 has a ring 86*b*. The two rings 86*a*, 86*b* are integrally joined together by ribs 88. The ribs 88 and the rings 86*a*, 86*b* form the filter scaffold. A tubular filter cloth 90 rests in the filter screen 82. An inflow to the piston pump 10 is effected from the inlet bore 36, between the rings 86*a*, 86*b* and ribs 88 of the filter scaffold, through the filter screen 82 and the filter cloth 90 into the open end of the bush 12. To allow the fluid to flow out of the inlet bore 36 through the filter cloth 90 of the filter 80 into the interstice 34, there is a circumferential gap between the ring 86*a* of the filter 80 and the piston 20, or else the ring 86*a* is provided with some axial openings.

For mounting on the bush 12, the ring 86*a* of the filter 80 has an axially protruding collar 92, which is placed in the manner of a close fit on the bush 12. Viewed in the radial direction, the collar 92 of the filter 80 that encloses the end of the bush 12 is adapted to the bush 12 in such a way that once the filter 80 and bush 12 have been put together, a press-fit is created between the bush 12 and the collar 92 and accomplishes the retention of the filter 80 on the bush 12.

The ring 86*a*, oriented toward the bush 12, of the filter scaffold 84 forms a loss-prevention means for the piston 20 before these parts are installed in the pump housing 16. The inside diameter of the ring 86*a* is smaller than an outside diameter of the end of the piston 20 located inside the bush 12. In the selected preferred exemplary embodiment, the support ring 58 belongs to the end of the piston 20 located inside the bush 12, and thus in this exemplary embodiment the inside diameter of the ring 86*a* of the filter 80 is smaller than the outside diameter of the support ring 58.

Via the support ring 58, the piston 20 has an encompassing shoulder 93, oriented toward the filter 80, on its face end. As long as the piston pump 10 has not yet been inserted into the pump housing 16, the ring 86*a* retains the piston 20 on its support ring 58 in the bush 12. Before the bush 12 is installed in the pump housing 16, the piston 20 can protrude out of the bush 12 only far enough that the shoulder 93 of the piston 20 comes to rest on the filter 80.

The connection between the filter 80 and the bush 12 that results from the press fit between the collar 92 and the bush 12 is thus dimensioned as sufficiently forceful that the piston restoring spring 54 cannot force the piston 20 out of the bush 12. As a result, the filter 80 holds the piston 20 in the bush 12 securely together before the bush 12 is inserted, together with the filter 80 and the piston 20, into the pump housing 16. The collar 92 may grip the bush from the outside, as shown, or engage it from the inside (not shown).

The assembly of the piston pump 10 of the invention is done by first placing the valve closing spring 68 and the valve ball 70 of the outlet valve 64 in the closure element 62. Next, the bush 12 is press-fitted into the closure element 62 or connected to it by crimping, and the spring 54 is placed in the bush 12. After that, the piston 20, with the support ring 58 slipped onto it and with the guide ring 26 and sealing ring 28 as well as the inlet valve 38 mounted on it, is inserted into the bush 12. By subsequent axially pressing on of the filter 80, the piston 20 is retained in the bush 12 in a manner secure against loss, and the piston pump 10 is preassembled as a compact, easily manipulated structural group. In the proposed piston pump embodied according to the invention, a preassembled structural group is created that includes the piston 20, the inlet valve 38, the piston restoring spring 54, the outlet valve 64, the closure element 62, and the filter 80. After the preassembly, the complete preassembled structural group is inserted into the cylinder bore 14 of the pump housing 16. A press fit between the bush 12 and the cylinder bore 14 effects sealing between the inlet and outlet sides, or in other words the low- and high-pressure sides, of the piston pump 10. A caulking 94 of the pump housing 16 on the closure element 62 brings about a pressure-tight closure of the cylinder bore 14 on the high-pressure side of the piston pump 10 and fixes the bush 12 in the pump housing 16.

The ring 86b of the filter 80 has an inside diameter that is no larger or only slightly larger than the outside diameter of the part of the piston 20 that protrudes through the ring 86b. Even before the preassembled structural group is inserted into the pump housing 16, this accordingly provides guidance of the piston 20 via the filter 80. Before the preassembled structural group is inserted into the pump housing 16, the end of the piston 20 protruding into the bush 12 is guided by the guide ring 26, and the end of the piston 20 protruding out of the bush 12 is guided by the ring 86b of the filter 80.

In a modification of this, it is also possible to embody the filter 80 in such a way that the guidance of the piston 20 takes place not in the region of the ring 86b but rather in the region of the ring 86a. In that case, the ring 86a has an inside diameter only slightly larger than the outside diameter of the part of the piston 20 protruding through the ring 86b. To enable the fluid to flow into the interstice 34, the inside diameter of the ring 86a is interrupted at a plurality of points.

Because the rings 86a, 86b of the filter 80 comprise plastic, the guidance of the piston 20 by the filter 80 can be achieved easily and without particular production effort and expense, and without the need to fear damage to the piston 20. After the insertion of the bush 12 into the pump housing 16, the piston 20 is no longer guided via the filter 80 but rather via the two guide rings 22 and 26, and thus the demands made of the material of the filter 80 can easily be met without effort or expense.

Even before the preassembled structural group is inserted into the pump housing 16, the piston 20 is guided and aligned with the aid of the filter 80, so that the preassembled structural group can advantageously be installed in the pump housing 16 very easily. Among other factors, this substantially facilitates the introduction of the piston 20 into the guide and sealing rings 22, 24 that have been placed in the pump housing 16 beforehand.

FIGS. 2–4 show examples of other possibilities for securing the filter 80, which forms a loss-prevention means for the piston 20, to the bush 12. In the exemplary embodiment of FIG. 2, the bush 12 is provided on its open end, on the inside thereof, with a rounded groove 95, which is engaged by an outward-protruding radial collar 96 of the filter 80. The groove 95 is made by caulking 97 or by crimping of the bush 12 once the filter 80 has been mounted on the bush 12. For its introduction into the bush 12, the radial collar 96 has a chamfer 98. The radial collar 96 rests on the bush 12 all the way around, so that no dirt can thus get past the filter to reach the interstice 34.

In the exemplary embodiment of FIG. 3, an edge 100 of the bush 12 is deformed radially inward by crimping and forms an undercut 102, which is engaged from behind by the radial collar 96 of the filter 80. The crimping creates a durable connection between the filter 80 and the bush 12.

In the exemplary embodiment of FIG. 4, the filter 80 is mounted on the bush 12 with a detent connection. In the vicinity of the open face end of the bush 12, a groove 104 is provided on its inside circumference. The groove 104 is preferably rectangular in cross section. A rectangular radial collar 106 of the filter 80 rests in this groove 104. For introducing the filter 80 into the bush 12, the bush 12 is provided with an inner chamfer 108. Because of the rectangular cross section of the groove 104 and the radial collar 106, the filter 80 is retained so well on the bush 12 that the filter 80 is not separated from the bush either by the force of the piston restoring spring 54 or by any pull that might be exerted on the piston 20.

In a modification of this exemplary embodiment, the groove 104 may for instance be located on the outer circumference of the bush 12 instead. In that case, the radial collar 108 of the filter 80 protrudes radially inward and can engage the groove 104 in this way.

In the embodiment of FIG. 4, the ring 86b of the filter 80, remote from the bush 12, forms the loss-prevention means for the piston 20. This ring 86b has a smaller inside diameter than the bush 12. Aside from a small guide gap, the outside diameter of the end of the piston 20 protruding into the bush 12 is equivalent to the inside diameter of the bush 12. Accordingly, the inside diameter of the ring 86b of the filter 80 is smaller than the outside diameter of the end of the piston 20 protruding into the bush 12.

In the exemplary embodiment shown as a detail in FIG. 4, the piston 20 is embodied in stepped fashion; the end of the piston 20 protruding into the bush 12 has a larger outside diameter than the end of the piston 20 protruding out of the bush 12. This creates a shoulder 93 at the piston 20. Before the preassembled structural group is inserted into the pump housing 16, the ring 86b of the filter 80 firmly retains the piston 20 via the shoulder 93, so that the piston 20 cannot slide out of the bush 12.

The filter 80 rests sealingly with its rings 86 on the bush 12 and on the cylinder bore 14, in order to prevent liquid flowing to the piston pump 10 from flowing into the piston pump 10 without passing through the filter screen 82 and the filter cloth 90.

In the embodiments of FIGS. 2–4, the filter 80 can also grip the bush 12 on the outside (not shown).

Via the shoulder 90, the filter 80 forming the loss-prevention means retains the piston 20. As the preferred selected exemplary embodiments show, the shoulder 93 can be located integrally directly on the piston 20 (FIG. 4), or else the shoulder 93 is located indirectly on the piston 20 (FIG. 1), for instance via the support ring 58 connected to the piston 20.

The foregoing relates to preferred exemplary embodiments of the invention, it being understood that other variants and embodiments thereof are possible within the spirit and scope of the invention, the latter being defined by the appended claims.

We claim:

1. A piston pump, comprising a pump housing, a bush in said pump housing, a piston which is drivable to execute a reciprocating stroke motion and is received axially displaceably at least partially in said bush which is insertable into said pump housing, the piston pump (10) has a filter (80), which is mounted on the bush (12) and which has a loss-prevention means (86a, 86b), that protrudes inward past an end edge of the bush (12), that keeps the piston (20) in the bush (12), and the filter (80), in the region of the loss-prevention means has an inside diameter which is smaller than an outside diameter of the piston (20).

2. The piston pump according to claim 1, in which the filter (80) is embodied hollow-cylindrically.

3. A piston pump, comprising a pump housing, a bush in said pump housing, a piston which is drivable to execute a reciprocating stroke motion and is received axially displaceably at least partially in said bush which is insertable into said pump housing, the piston pump (10) has a filter (80), which is mounted on the bush (12) and which has a loss-prevention means (86a, 86b), that protrudes inward past an end edge of the bush (12), that keeps the piston 20 in the bush (12), and the filter (80) is mounted on the bush (12) in an extension of the bush (12).

4. The piston pump according to claim 3, in which the filter (80) and the bush (12) are joined together in the manner of a close-tolerance fit.

5. The piston pump according to claim 4, in which the filter (80), for being secured to the bush (12), has a press fit with regard to the bush (12).

6. The piston pump according to claim 3, in which the filter (80) is mounted on the bush (12) via a snap or detent connection (95, 96; 104, 106).

7. The piston pump according to claim 3, in which the filter (80) is mounted on the face end of the bush (12) by means of a local deformation.

8. A piston pump, comprising a pump housing, a bush in said pump housing, a piston which is drivable to execute a reciprocating stroke motion and is received axially displaceably at least partially in said bush which is insertable into said pump housing, the piston pump (10) has a filter (80), which is mounted on the bush (12) and which has a loss-prevention means (86a, 86b), that protrudes inward past an end edge of the bush (12), that keeps the piston (20) in the bush (12), and the loss-prevention means forms guides (86a, 86b) on the filter (80) that guides the piston (20).

* * * * *